United States Patent [19]

Chao et al.

[11] Patent Number: 4,980,767

[45] Date of Patent: Dec. 25, 1990

[54] TECHNIQUE FOR DETERMINING SIGNAL DISPERSION CHARACTERISTICS IN COMMUNICATIONS SYSTEMS

[75] Inventors: Tzy-Hong Chao, Taichung, Taiwan; Burton R. Saltzberg, Middletown; Jin-Der Wang, Ocean, both of N.J.

[73] Assignee: AT&T Bell Laboratories, Murray Hill, N.J.

[21] Appl. No.: 494,941

[22] Filed: Mar. 14, 1990

Related U.S. Application Data

[63] Continuation-in-part of Ser. No. 443,772, Nov. 30, 1989, abandoned.

[51] Int. Cl.$^5$ ............................................. H04N 7/08
[52] U.S. Cl. ................................... 358/187; 358/905; 358/21 V; 375/13; 375/15
[58] Field of Search ............. 358/187, 905, 139, 21 V; 375/13, 15, 39

[56] References Cited

U.S. PATENT DOCUMENTS

| | | | |
|---|---|---|---|
| 4,009,356 | 2/1977 | Borysiewicz | 375/13 |
| 4,335,396 | 6/1982 | Rzeszewski | 358/21 V |
| 4,394,767 | 7/1983 | Shum | 375/13 |
| 4,694,328 | 9/1987 | LoCicero | 358/21 V |
| 4,864,403 | 9/1989 | Chao | 358/905 |
| 4,912,557 | 3/1990 | Faroudja | 358/905 |

OTHER PUBLICATIONS

Chao, Tzy-Hong S., "Multi-Path Equalization for NTSC Video by Using Digital IIR Filter," *IEEE Transactions on Consumer Electronics*, vol 34, No. 1, Feb. 1988, pp. 268-278.

Advanced Television Systems Committee (ATSC) Standards proposal by the Japanese Broadcasting Technology Association presented during ATSC Standard Committee Meeting, Sep. 18, 1989, "Ghost Cancelling System".

*Primary Examiner*—Howard W. Britton
*Attorney, Agent, or Firm*—David R. Padnes

[57] ABSTRACT

The present invention covers the notion of determining signal dispersion characteristics, such as amplitude, phase and delay, by transmitting training sequences. More specifically, each sequence comprises a plurality of predetermined symbols and is transmitted two or more times. Detection of each training sequence is provided by a correlator at the receiver. This detection creates a signal peak for each training sequence at the output of the correlator. Between the peaks, a "quiet zone" is created which permits signal dispersion in this zone to be characterizerd with respect to amplitude, phase and delay. Two different quiet zones are utilized to resolve ambiguities which arise in determining the aforesaid signal dispersion characteristics.

40 Claims, 7 Drawing Sheets

TECHNIQUE FOR DETERMINING SIGNAL DISPERSION CHARACTERISTICS IN COMMUNICATIONS SYSTEMS

CROSS-REFERENCE TO RELATED APPLICATIONS

This application in a continuation-in-part of application Ser. No. 443,772, filed on Nov. 30, 1989, now abandoned.

TECHNICAL FIELD

The present invention relates to a technique for determining the characteristics of signal dispersion and, more particularly, to a technique in which training sequences are repetitively transmitted to create time intervals in which the characteristics of the signal dispersion can be accurately quantified.

BACKGROUND OF THE INVENTION

A training sequence is a series of apriori known symbols which are transmitted at predetermined times from signal transmitter to signal receiver. Such sequences have long been used to adjust the operation of signal dispersion compensation apparatus in the receiver, such as equalizers, echo cancellers and the like.

Signal dispersion, such as echoes or signal "ghosts," is an inherent problem in communications systems and the severity of the problem can vary with the system application. For example, signal ghosts or echoes at levels which are merely objectional to the viewer of a received conventional television signal can render a high definition television (HDTV) signal unintelligible. Accordingly, compensation for signal dispersion is required in this and in many other communications systems. Moreover, while signal dispersion compensation apparatus, such as equalizers and cancellers, provide satisfactory compensation, knowledge of the signal dispersion characteristics, e.g., amplitude, delay and phase, is useful for the adjustment of such apparatus during system start-up and operation.

Prior art techniques exist which can determine the characteristics of signal dispersion. Such techniques typically transmit specific signals, such as square wave pulses or training sequences, which are detected and analyzed in the receiver. These techniques provide satisfactory estimates of the signal dispersion characteristics in applications wherein the dispersion is large in amplitude and short in duration. However, the prior art techniques provide inaccurate results when the signal dispersion is small in amplitude, particularly in the presence of channel noise, jitter or similar impairments, and provide ambiguous results when the signal dispersion is long in duration. These shortcomings have hindered development of communications systems requiring ever-more precise signal dispersion compensation and more precise determination of the signal dispersion characteristics. Therefore, a technique which provides greater accuracy in the determination of small-amplitude and long-duration signal dispersion would be desirable.

SUMMARY OF THE INVENTION

Pursuant to the present invention, the characteristics of signal dispersion, such as amplitude, phase and delay, are determined by sending training sequences from a transmitter to a receiver of a communications system. Each training sequence includes a plurality of predetermined symbols and is transmitted two or more times. Detection of each training sequence in the receiver is provided by a correlator. This detection creates a signal peak for each training sequence at the correlator output so that at least two such peaks are formed by the repetitive transmission of each training sequence. Such peaks create a "quiet zone" therebetween in which the characteristics of the signal dispersion can be determined. At least two different training sequences, each having a different number of symbols, are used to create quiet zones having different time durations. The use of different training sequences virtually eliminates ambiguities which may arise in the determination of the signal dispersion characteristics.

A feature of the present invention is that it is applicable to a variety of different communications systems and is particularly adaptable for television signal transmission wherein the training sequences can be advantageously transmitted during the vertical blanking interval. Another feature of the present invention is that it significantly improves the accuracy of determining the characteristics of signal dispersion when such dispersion is of long duration, has a small amplitude, or is accompanied by channel noise, jitter and similar impairments.

DETAILED DESCRIPTION

Figure 1:
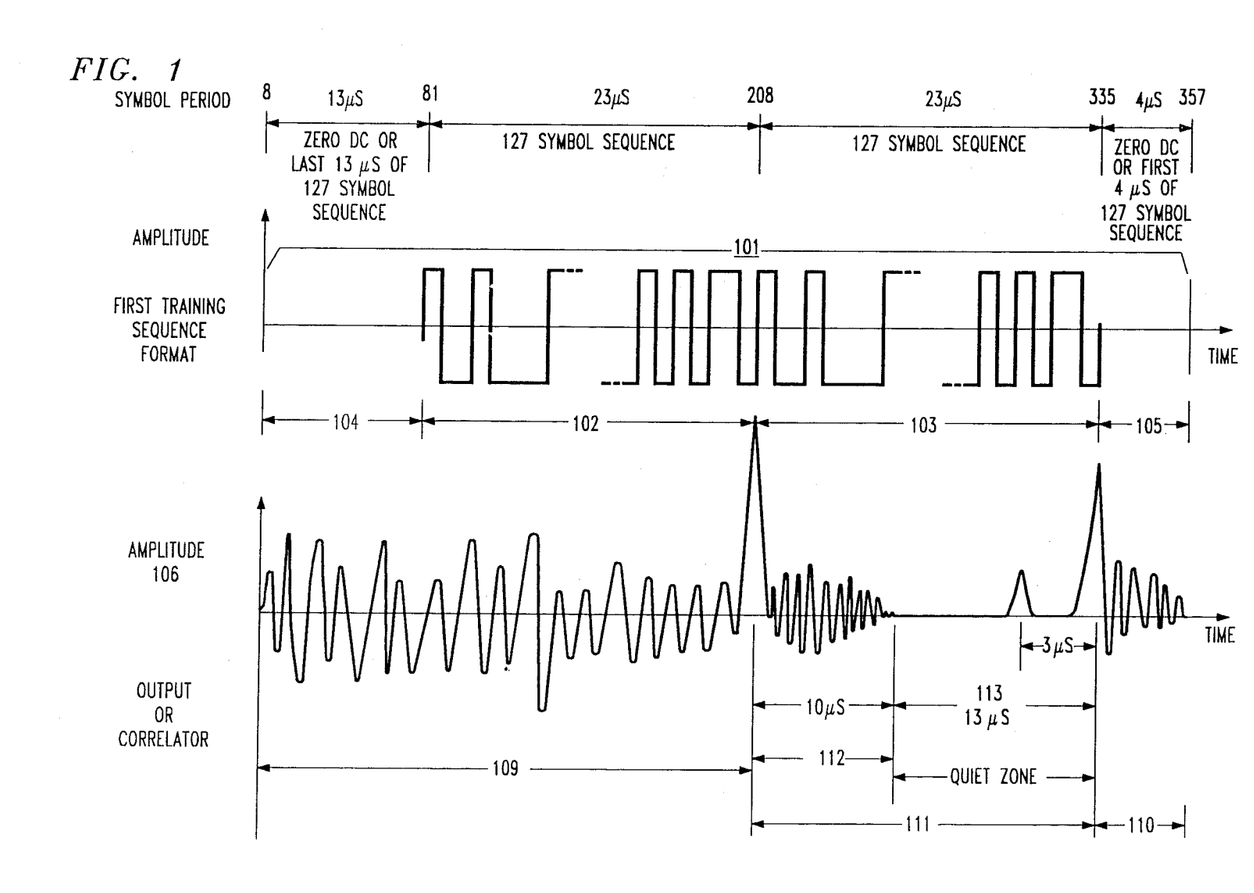
FIGS. 1 and 2 depict several waveforms useful for understanding the principles of the present invention.
Figure 2:
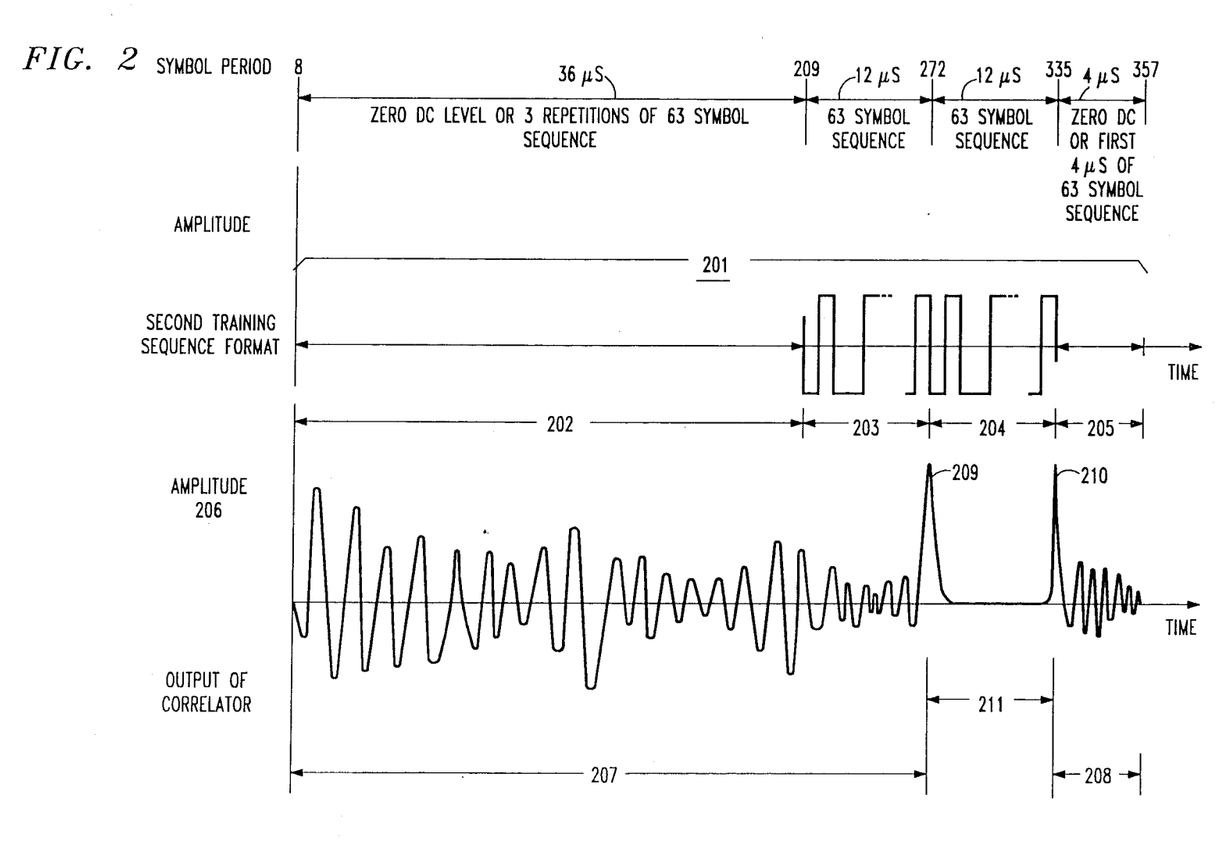

FIGS. 1 and 2 show two different training sequence formats 101 and 201, in accordance with our embodiment of the present invention, and their effects upon passing through a correlation filter in a receiver. Each of these training sequence formats is preceded and succeeded by other signals (not shown). For illustrative purposes, the formats 101 and 201 are ones which are particularly suitable for use in an HDTV or conventional television transmission system wherein a quadrature amplitude modulated (QAM) or vestigial sideband (VSB) signal is transmitted and the other signals preceding and following each training sequence format are video signals and their associated voice signals.

In this exemplary embodiment, it will be assumed that there is a ghost delay characteristic which extends from $-4$ microseconds ($\mu$s) to $+23$ $\mu$s. Ghosts falling in the interval between $-4$ and $0$ $\mu$s are known as precursor ghosts, i.e., they are ghosts which are received prior to an associated transmitted signal. On the other hand, ghosts falling in the interval between $0$ and $+23$ $\mu$s are known as postcursor ghosts, i.e., they are received after the reception of the associated transmitted signal.

Each of the training sequence formats 101 and 201 extends for 357 symbol periods and is transmitted at a rate of $5.52 \times 10^6$ symbols per second. Therefore, either one or both of these formats can be transmitted within the vertical blanking interval of a video frame. The first eight symbol periods (not shown) of formats 101 and 201 are reserved for functions other than those necessary for the operation of the present invention and need not be discussed.

As shown by format 101, a first training sequence is transmitted in each of successive time intervals 102 and 103. Each first training sequence can be a pseudorandom sequence having 127 symbols and extending for 23 microseconds (μs). In time interval 104, which precedes time interval 102, there is either no transmission of any training sequence, i.e., a zero dc signal level is present, or the last 13 μs of the 23 μs training sequence in time interval 102 is transmitted. Similarly, in time interval 105, a zero dc signal level is present or the first 4 μs of the training sequence in time interval 102 is transmitted. The selection of the signal transmitted in time interval 104 is independent of that selected for time interval 105. The function of intervals 104 and 105 is to limit the signals which produce ghosts in time interval 111. For purposes of simplicity, it will be assumed in the discussion which immediately follows that a zero dc level is maintained in time intervals 104 and 105.

Waveform 106 shows the effect of passing format 101 through a correlation filter in the receiver. In well-known manner, such a filter is designed to provide a large amplitude output pulse upon detecting each 127 symbol pseudorandom sequence. At other times, the correlator output may be ambiguous and the correlator output amplitude is substantially less than when the training sequence is detected. The detection of the pseudorandom sequence transmitted during interval 102 produces output pulse 107 while the detection of the pseudorandom sequence transmitted in time interval 103 produces output pulse 108. Time interval 111 is the 23 μs time period between pulses 107 and 108. If no ghosts were present, the time interval between these two peaks would be quiet, i.e., they would have a constant, low dc value. Assuming, however, that ghosts are present, which can have delays of up to 23 μs, up to the first 10 μs immediately following peak 107 may be corrupted by ghosts of the video and/or voice signals transmitted immediately prior to time interval 104. This 10 μs time interval is designated by reference numeral 112.

The balance of time interval 111, designated as time interval 113 and referred to as a "quiet zone," is devoid of ghosts except those of the training sequence transmitted in intervals 102 or 103. Ghosts of the training sequence of interval 102 appearing in this quiet zone would be postcursor ghosts having delays between 10 and 23 μs and would be positioned 10 to 23 μs after peak 107. Similarly, ghosts of the training sequence of interval 103 appearing in this quiet zone would be precursor ghosts having delays from 0 to −4 μs and would be positioned 0 to 4 μs before peak 108. One illustrative training sequence ghost is depicted by peak 114 which is disposed 3 μs prior to peak 108.

It should be recognized at this juncture that the amplitude and position of peak 114 can vary with the ghost amplitude, delay and phase characteristics. Indeed, the position of peak 114 can appear up to 4 μs before or up to 23 μs after its associated correlator output pulse. As will be discussed hereinbelow, this smaller peak is examined, pursuant to the present invention, to determine the ghost amplitude, delay and phase characteristics.

It should also be appreciated that peak 114, as positioned in FIG. 1, presents an ambiguity in that it can be representative of a postcursor ghost of the training sequence transmitted in time interval 102 having a delay of 20 μs or can be representative of a precursor ghost of the training sequence transmitted in time interval 103 having a delay of −3 μs, i.e., it precedes the associated correlator output pulse by 3 μs. Therefore, while the creation of time interval 111 between peaks 107 and 108 provides a time period 113 in which ghost characteristics can be determined, an ambiguity in the illustrative embodiment does exist in determining the delay of postcursor ghosts whose delays are between 19 and 23 μs and precursor ghosts whose delays are between 0 and −4 μs. In addition, the ambiguities appearing in time interval 112 do not permit an accurate ghost characteristic determination for delays between 0 and 10 μs.

To virtually eliminate such ambiguities in determining ghost characteristics, a second training sequence format, different from the first training sequence, is also transmitted at the same symbol rate as the first training sequence. This format is designated as 201 in FIG. 2. During the 36 μs time interval 202, a zero dc level is maintained. Immediately, following time interval 202, the second training sequence, including 63 symbols and extending for 12 μs, is transmitted twice in successive time intervals 203 and 204. In the remaining 4 μs, designated as time interval 205, a zero dc level is maintained. The second training sequence, like the first training sequence, can be a pseudorandom sequence. In addition, as was the case for the first training sequence format, in lieu of a zero dc level being maintained in time intervals 202 and 205, the second training sequence could be repetitively transmitted three times during time interval 202 and/or the first 4 μs of the second training sequence in time intervals 203 or 204 could be transmitted during time interval 205. Again, as was the case for the first training sequence format, the selections of the signals transmitted during time intervals 202 and 205 are independent of one another. For purposes of illustration, waveform 206, which illustrates the output of a correlation filter in the receiver, is shown for the case of a zero dc signal in time intervals 202 and 205.

During time intervals 207 and 208, ghosts of the other signals which precede and succeed the training sequences may be present. Peaks 209 and 210 are produced by the correlation filter and respectively correspond to the detection of the second training sequence transmitted in time intervals 203 and 204. Between these peaks, a second quiet zone 211 extending for 12 μs is produced.

The methodology of resolving the above-described ambiguity between postcursor ghosts and precursor ghosts relies on a comparison of the position of any ghosts in the first and second quiet zones. Any detected ghost that maintains the same relative position in these quiet zones, i.e., the position of the ghost relative to the end of each quiet zone, such as peaks 108 and 210, is declared to be a precursor ghost while any ghost that appears in one position in quiet zone 113 and does not appear or does not maintain the same position relative to the end of quiet zone 211 is declared to be a postcursor ghost. In FIGS. 1 and 2, peak 114 appears in quiet zone 113 20 μs after peak 107 and does not appear in quiet zone 211. Therefore, peak 114 represents a postcursor ghost of the training sequence transmitted in time interval 102 and has a delay of 20 μs. Using well-known techniques, such as comparing the amplitude of peak 114 against one or more quantizing levels, the amplitude of the ghost can also be determined. In addition, as will be discussed, an estimate of the correct carrier phase in the receiver along with an automatic gain control circuit adjustment can be provided using correlator filters in the receiver.

Figure 3:
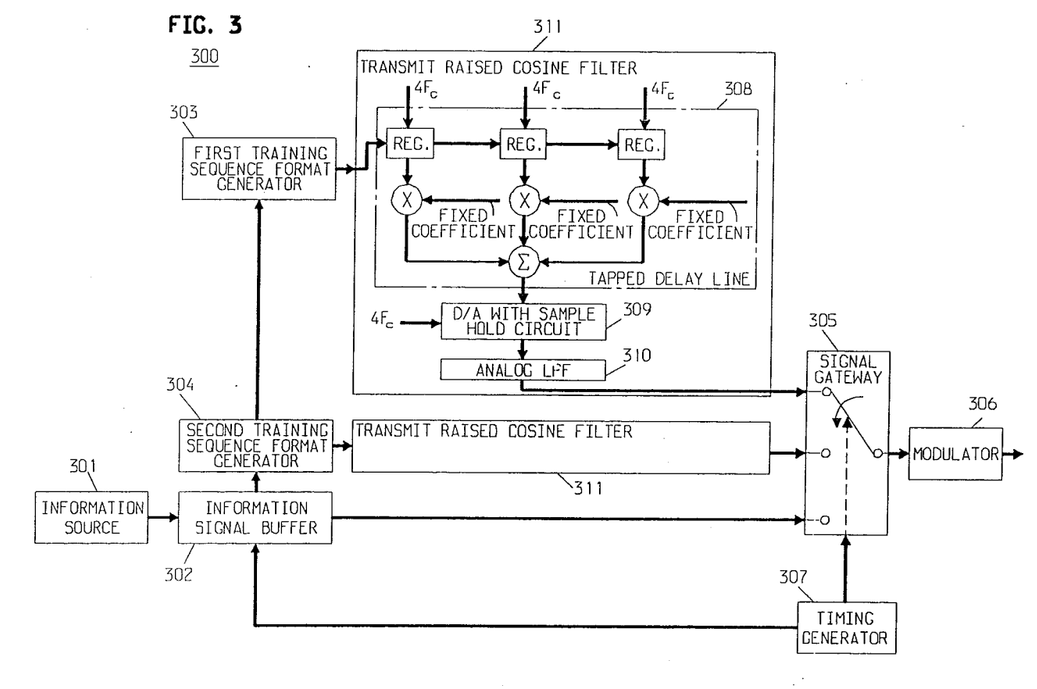
FIG. 3 is a block-schematic diagram representation of embodiment of a transmitter which incorporates the present invention.

Turn now to FIG. 3 which shows a transmitter 300 which incorporates the present invention. The transmitted information signal, which in the illustrative embodiment is an HDTV signal, is generated by information source 301 and is coupled to information signal buffer 302. First training sequence format generator 303 and second training sequence format generator 304 respectively generate formats 101 and 201. Signal gateway 305, illustratively represented by a single-pole multi-throw switch, selectively couples the signals within buffer 302 or generators 303 or 304 to modulator 306 which provides the illustrative QAM modulation. In a preferred embodiment, the timing sequences from generators 303 or 304 modulate only the in-phase (I) component of the QAM modulation. Timing generator 307 provides the necessary clocking signals for transmitter 300. In addition, generator 307 also controls which signal is coupled through signal gateway 305. Accordingly, in one illustrative embodiment, generator 307 causes gateway 305 to couple the information signal in buffer 302 to modulator 306 except during the vertical blanking interval. During this interval, generator 307 causes gateway 305 to couple the signals provided by generator 303 in one field of the vertical blanking interval and to couple the signal provided by generator 304 in the next field in the vertical blanking interval and so on. As a result, the waveforms 101 and 201 appear in the vertical blanking interval in alternation.

It is advantageous to spectrally shape each of the training sequences prior to transmission. To accomplish this shaping, raised cosine transmit filters 311 are are disposed between generators 303 and 304 and signal gateway 305. Filter 311 advantageously includes a tapped delay line 308, digital-to-analog (D/A) converter with a sample hold circuit 309 and an analog low-pass filter (LPF) 310 connected in series. Tapped delay line 308 and D/A converter 309 are clocked at four times the training sequence symbol rate, 4 $F_c$. Analog LPF 310 advantageously eliminates out-of-band signal energy.

Figure 4:
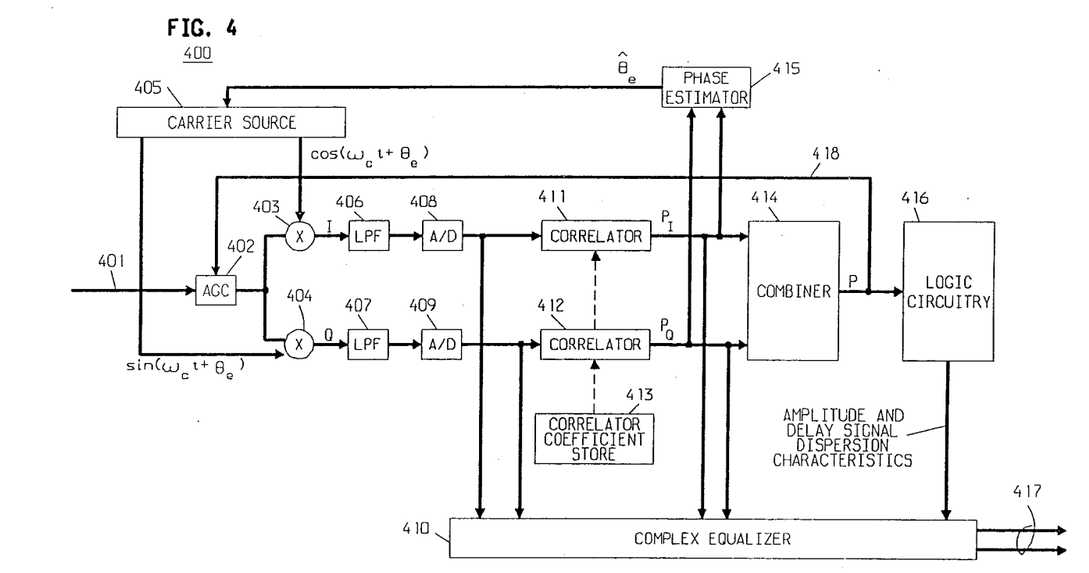
FIGS. 4 and 5 respectively are block-schematic diagram representations of embodiments of baseband and passband receivers which incorporate the present invention.

FIG. 4 shows a baseband receiver which incorporates the present invention. As shown, the received QAM signal incorporating the training sequence formats of FIGS. 1 and 2 is coupled via lead 401 through automatic gain control (AGC) circuit 402 to demodulators 403 and 404. Each demodulator multiplies the received QAM signal by carrier signals generated by carrier source 405. One of these carrier signals is represented by $\cos(\omega_c t + \theta_e)$ while the other is represented by $\sin(\omega_c t + \theta_e)$, where $\omega_c$ is the carrier frequency used in the transmitter modulator 306 of FIG. 3 and $\theta_e$ is the phase angle between the carrier signals supplied by carrier source 405 and those utilized by modulator 306.

The digital outputs of demodulators 403 and 404, respectively designated as I and Q, are coupled through low pass filters (LPF) 406 and 407 to analog-to-digital (A/D) converters 408 and 409. The digital outputs of these converters are supplied to complex equalizer 410 which removes the distortion in the received signal and accurately recovers the transmitted information signal on output leads 417. The term "complex," with reference to equalizer 410, refers to the fact that this equalizer utilizes coefficients which are complex numbers, i.e., they have a real and an imaginary component. The digital outputs of converters 408 and 409 are also coupled to correlators 411 and 412. Each of these correlators produces the quiet zones of FIGS. 1 and 2 by respectively generating pulses 107 and 108 upon detecting the first training sequence in intervals 102 and 103 of FIG. 1 and by respectively generating pulses 209 and 210 upon detecting the second training sequence in intervals 203 and 204 of FIG. 2. Combiner 414 receives the outputs of correlators 411 and 412, respectively designated as $P_I$ and $P_Q$, and produces the sum of the square of these correlator outputs. This sum is designated as P.

Each of correlators 411 and 412 advantageously has the capability to detect the first and second training sequences. To provide this capability, each correlator must be supplied with the appropriate sets of correlator filter coefficients for each training sequence. Such coefficients sets are downloaded from correlator coefficient store 413 to the correlators prior to the reception of the associated training sequences.

It is also preferable that the correlator filter coefficients be binary numbers corresponding to those in the associated training sequence since such coefficients can have only one of two values, such as $+1$ and $-1$, and implementation is thereby simplified. However, the use of binary coefficients requires that the dc bias in the quiet zones be eliminated. Such dc bias, which is inherent due to the autocorrelation nature of a pseudorandom sequence, can be eliminated using well-known techniques. For example, in one such technique the dc bias can be measured and then subtracted from $P_I$ and $P_Q$ or from the signal combiner output signal P. In another technique, the dc bias can be eliminated by passing $P_I$ and $P_Q$ or P through a properly chosen dc blocking filter (not shown), such as those which subtract a delayed version of the signal from the signal itself.

A modified pseudorandom sequence can be transmitted in lieu of a pseudorandom sequence. In a modified pseudorandom sequence, a dc constant is added to each symbol of a pseudorandom sequence so that the transmitted symbols are either zero or a positive value rather than the equal positive or negative values of the original pseudorandom sequence. The advantage of using a modified pseudorandom sequence is that, unlike the original pseudorandom sequence, there is no dc bias in any quiet zone at the output of a correlator. Accordingly, it is preferable to utilize both binary correlators and modified pseudorandom training sequences in the preferred embodiment of the present invention. For another arrangement, a pseudorandom sequence having $+1$ and $-1$ symbol values is transmitted and the coefficients of the binary correlator take values of either $+1$ or 0 instead of the $+1$ and $-1$ values.

Logic circuitry 416 determines the amplitude and delay ghost characteristics in response to the signal P and resolves the ambiguity between precursor and postcursor ghosts. While these determinations can be made in response to correlator output $P_I$ and, therefore, use of correlator 412 and combiner 414 can be eliminated, the use of both correlators and the combiner advantageously provides a mechanism for adjusting the carrier phase produced by carrier source 405 and the automatic gain control provided by AGC circuit 402. In addition, use of both signals $P_I$ and $P_Q$ allows the estimation of ghost characteristics while carrier phase adjustment is still taking place.

Estimation of the correct carrier phase can be determined by using $P_I$ and $P_Q$ by well-known means within phase estimator 415 which approximate the arc tangent of $P_Q/P_I$. Adjustment of the carrier phase can then be readily provided by coupling the estimated carrier phase, designated as $\theta_e$, appearing at the output of the phase estimator to carrier source 405. Similarly, by using the signal P, it is well-known that the amplitude of the received signal can be estimated so as to correct the gain of the receiver. In FIG. 4, signal P is coupled to AGC circuit 402 via lead 418 to provide this gain adjustment.

The amplitude and delay characteristics provided by logic circuitry 416 along with signals $P_I$ and $P_Q$ are coupled to complex equalizer 410 wherein they are used to adjust the operation thereof. Specifically, in well-known fashion, the amplitude and delay characteristics are used to determine which equalizer coefficients are non-zero and signals $P_I$ and $P_Q$ are used to adjust the values of these non-zero coefficients.

Figure 5:
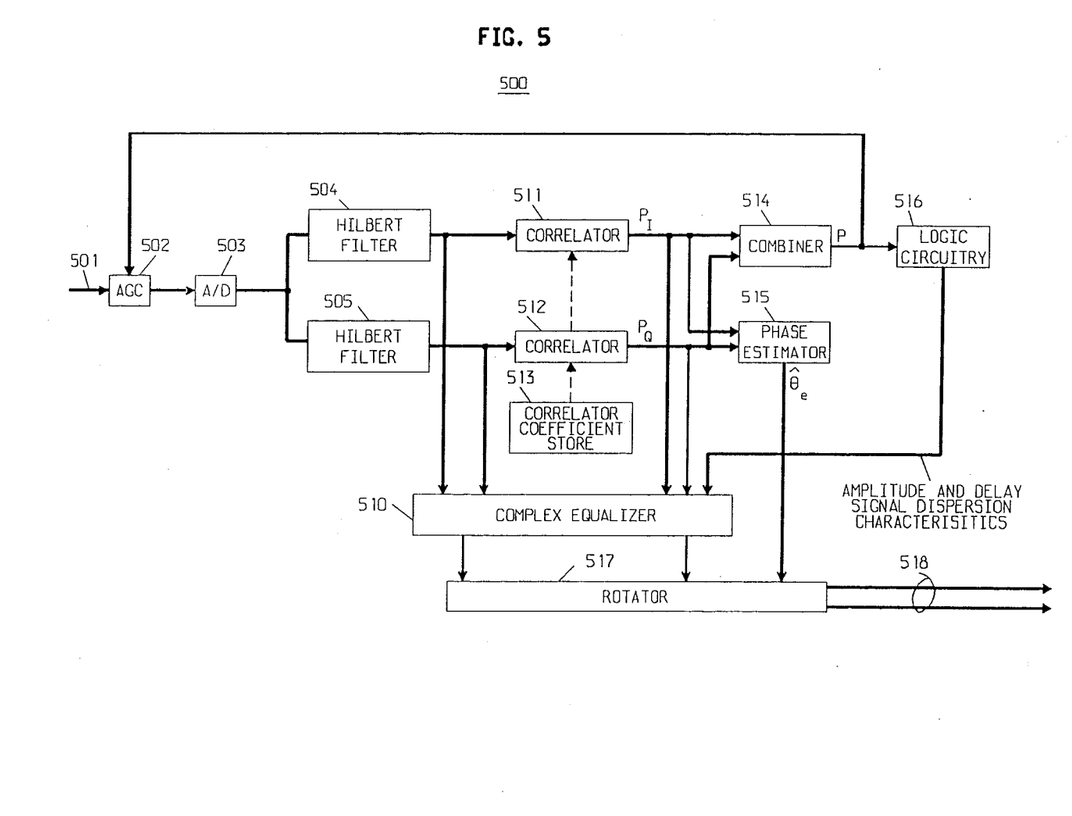

FIG. 5 shows a passband receiver 500 which incorporates the present invention. In this receiver, the received QAM signal on lead 501 is coupled through AGC circuitry 502 to A/D converter 503 and thence to passband Hilbert filter pair 504 and 505. Filters 504 and 505 provide outputs which are coupled to complex equalizer 510 which, in turn, is connected to rotator 517 to produce the transmitted information signal on output leads 518. The Hilbert filter outputs are also coupled to correlators 511 and 512 which function in the same manner as correlators 411 and 412 when supplied with the appropriate coefficients by correlator coefficient store 513. The $P_I$ and $P_Q$ outputs of these correlators are coupled to combiner 514 and logic circuitry 516 which are functional equivalents to combiner 414 and logic circuitry 416 of FIG. 4. In addition, as was the case for the baseband receiver 400, the AGC circuitry can be adjusted using the signal P produced by combiner 514, an estimate of the correct phase from phase estimator 515 can be coupled to rotator 517 and, in well-known fashion, the amplitude and delay characteristics provided by logic circuitry 516 and signals $P_I$ and $P_Q$ can be used to adjust equalizer 510.

Figure 6:
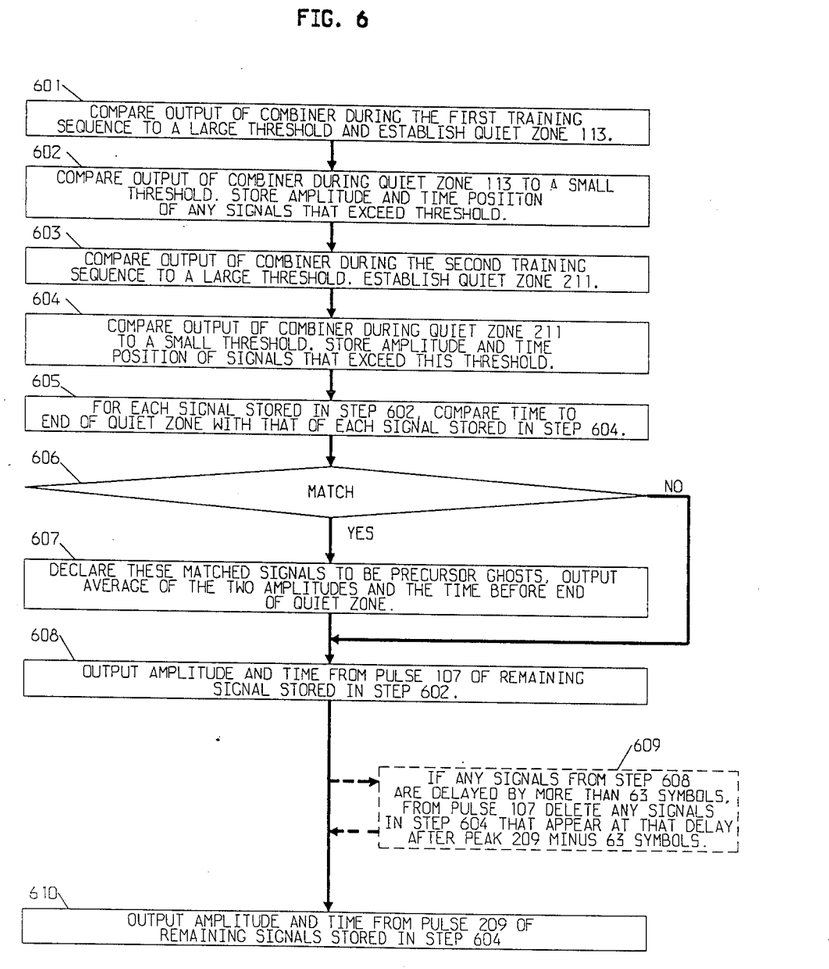
FIG. 6 is a flowchart of the operations provided by the logic circuitry of FIGS. 4 and 5.

Refer now to FIG. 6 which shows the logical operations performed by logic circuitry 416 and 516 in FIGS. 4 and 5. In step 601, the logic circuitry establishes quiet zone 113 by detecting each first training sequence. Such detection is accomplished by comparing the output amplitude of combiner 414 or 514 to a predetermined large threshold. This amplitude comparison is made when these correlators are downloaded with the appropriate coefficients for the first training sequence and the predetermined large threshold has a value which readily distinguishes peaks 107 and 108 from other ghost peaks. Once peaks 107 and 108 are detected, the time interval therebetween defines time interval 111. Quiet zone 113 is then established by subtracting a predetermined and fixed time interval 112 from time interval 111.

Step 602 determines the existence of any ghost peaks in quiet zone 113 by comparing the output of combiner 414 or 514 to a predetermined small threshold whose value is selected to provide a desired sensitivity and yet be able to distinguish ghost peaks from random noise. The amplitude and time position for each peak whose amplitude is greater than the predetermined small threshold is stored.

Steps 603 and 604 provide the same functions as steps 601 and 602, respectively, when the second training sequence is received and, hence, the appropriate coefficients are downloaded into the correlators. In step 603, quiet zone 211 is established by comparing the output of combiner 414 or 514 to a predetermined large threshold to determine peaks 209 and 210. The time interval therebetween determines quiet zone 211. In step 604, the amplitude and time position of any peaks in the second quiet zone which have amplitudes greater than a predetermined small threshold are stored.

In step 605, the time position of any detected peak in quiet zone 113 relative to the end of quiet zone 113 is compared to the time position of any detected peak in quiet zone 211 relative to the end of quiet zone 211. If there is a match in step 606, then the matched peaks are declared to be precursor ghosts in operation 607 and the amplitudes of the matched peaks are averaged and outputted together with their time position in the quiet zones. These ghosts are deleted from the information stored in steps 602 and 604, and the sequence proceeds to step 608. If there is no match in step 606, the sequence bypasses step 607 and proceeds directly from step 606 to step 608.

In steps 608 and 610, the time position and amplitudes of the remaining detected peaks stored in steps 602 and 604 are outputted and these peaks correspond to postcursor ghosts.

Step 609, which occurs between steps 608 and 610, is performed when the training sequence formats 101 and 201 of FIG. 1 do not maintain a zero dc level in time intervals 104, 105, 202 and 205 but, instead, contain the last 13 $\mu$s of the first training sequence in time interval 104, the first 4 $\mu$s of the first training sequence in time interval 105, three repetitions of the second training sequence in time interval 109 and the last 4 $\mu$s of the second training sequence in time interval 205. In this arrangement, if there are any detected peaks from step 608 which are delayed by more than 63 symbols from peak 107, then any detected peaks in step 604 that appear at this delay minus 63 symbols after peak 209 are deleted before step 610.

Figure 7:
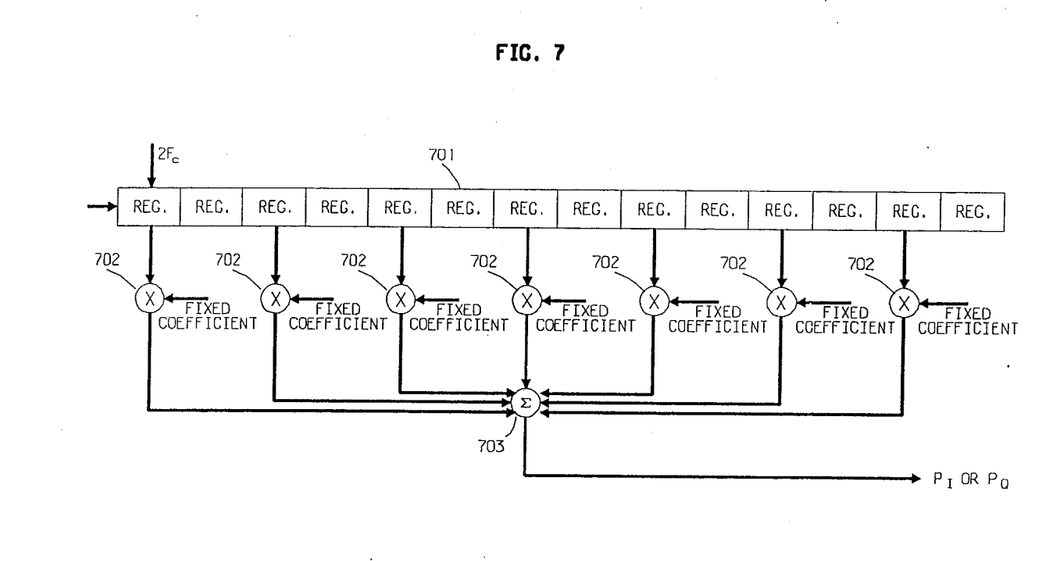

In FIGS. 4 and 5, it is advantageous for the A/D converters and correlators to operate at a rate which a multiple, n, of the symbol rate, where n is an integer $\geq 1$. in order to provide higher resolution of the signal dispersion delay. With such an arrangement, it is preferable to implement the correlator as shown in FIG. 7. As illustrated in FIG. 7, the correlator is implemented by utilizing a tapped delay line 701, clocked at twice the symbol rate, to 2 $F_c$, multipliers 702 and summer 703. Each multiplier utilizes a fixed correlator coefficient which multiplies the symbol value stored in one of the taps of delay line 701. The delay line taps which are combined by summer 703 are spaced apart by the symbol rate. The intermediate taps are not associated with a multiplier and, therefore, are not inputted to summer 703. Where a binary correlator is utilized, the correlation coefficients are either +1, −1 or +1, 0. With such coefficients, the multipliers 702 can be realized by pass through elements for a +1 multiplication, sign inversion elements for a −1 multiplication, and signal blocking elements for a 0 multiplication.

It should, of course, be understood that while the present invention has been described in reference to a disclosed embodiment, numerous alternative arrangements should be apparent to those of ordinary skill in the art. For example, while the present invention has been disclosed in reference to a QAM signal, the invention is applicable to any analog or digital communication system regardless of the presence, absence or type of modulation. In addition, the present invention is not limited to pseudorandom or modified pseudorandom training sequences and, indeed, can employ any sequence, e.g., a polyphase sequence, that can provide the quiet zones of FIGS. 1 and 2. Furthermore, the complex equalizer shown in FIGS. 4 and 5 can be positioned so that its outputs are coupled to each correlator input. In this arrangement, the equalizer serves as a unit impulse fixed filter during system initialization and serves as an adaptive equalizer thereafter.

We claim:

1. Transmitter apparatus for use in a communications system, said apparatus comprising
    means for generating a first training sequence at least two times in succession and for generating a second training sequence at least two times in succession, said first training sequence including a first number of predetermined symbols and said second training sequence including a second number of predetermined symbols, said first and second numbers being different, and
    means for transmitting each of said first and second training sequences in associated time intervals.

2. The transmitter apparatus of claim 1 wherein said first and second sequences generated by said generating means are modified pseudorandom sequences in which a constant value is added to each symbol in at least one pseudorandom sequence.

3. The transmitter apparatus of claim 1 wherein said first and second sequences generated by said generating means are polyphase sequences.

4. The transmitter apparatus of claim 1 wherein said generating means generates said first training sequence a first number of times in succession and generates said second training sequence a second number of times in succession, said first and second number of times being different.

5. The transmitter apparatus of claim 1 wherein said transmitting means also transmits information signals in time intervals surrounding said associated time intervals.

6. The transmitter apparatus of claim 1 wherein said generating means generates a substantially zero dc signal in a predetermined time period immediately preceding the successive generation of said first training sequence.

7. The transmitter apparatus of claim 1 wherein said generating means generates a substantially zero dc signal in a predetermined time period immediately succeeding the successive generation of said first training sequence.

8. The transmitter apparatus of claim 1 wherein said generating means generates a substantially zero dc signal in a predetermined time period immediately preceding the successive generation of said second training sequence.

9. The transmitter apparatus of claim 1 wherein said generating means generates a substantially zero dc signal in a predetermined time period immediately succeeding the successive generation of said second training sequence.

10. The transmitter apparatus of claim 1 wherein said generating means generates a predetermined portion of said first training sequence comprising less than said first number in a first time period immediately preceding the successive generation of said first training sequence.

11. The transmitter apparatus of claim 1 wherein said generating means generates a predetermined portion of said first training sequence comprising less than said first number in a time period immediately succeeding the successive generation of said first training sequence.

12. The transmitter of claim 1 wherein said generating means generates a predetermined portion of said second training sequence comprising less than said second number in a first time period immediately succeeding the successive generation of said second training sequence.

13. The transmitter apparatus of claim 1 wherein said transmitting means further includes means for spectrally shaping said first and said second training sequences prior to transmission.

14. The transmitter apparatus of claim 13 wherein the predetermined symbols in said first and second training sequences occur at a predetermined symbol rate and said spectral shaping means includes a tapped delay line clocked at a multiple of said predetermined symbol rate.

15. The transmitter apparatus of claim 1 wherein said first and second sequences generated by said generating means are pseudorandom sequences. sequences.

16. The transmitter apparatus of claim 15 wherein said predetermined symbols in said pseudorandom sequence have equal positive and negative values.

17. The transmitter apparatus of claim 15 wherein said predetermined symbols in said pseudorandom sequence have values which are zero and non-zero.

18. Receiver apparatus for use in a communication system wherein any received signal has propagated through a communications medium in which signal dispersion may be present, said receiver apparatus comprising
    means for correlating each of a plurality of received first training sequences with a predetermined set of coefficients and for correlating each of a plurality of received second training sequences with another predetermined set of coefficients, each received first sequence including a first number of predetermined symbols and each received second training sequence including a second number of predetermined symbols, said first number being different from said second number, and
    means responsive to the correlated first and second training sequences for determining at least one characteristic of said signal dispersion.

19. The receiver apparatus of claim 18 wherein each of said first and second training sequences is received two times and said correlating means correlates each of said first and second training sequences two times.

20. The receiver apparatus of claim 18 wherein each of said first and second received training sequences are pseudorandom sequences and said correlating means correlates these pseudorandom sequences.

21. The receiver apparatus of claim 18 wherein said determining means determines the amplitude and delay characteristics of said signal dispersion.

22. The receiver apparatus of claim 18 further including a source of at least one carrier signal and said determining means determines the phase characteristic of said signal dispersion and controls said carrier signal source.

23. The receiver apparatus of claim 18 further including an equalizer and said determining means adjusts the operation of said equalizer.

24. The receiver apparatus of claim 18 further including an automatic gain control circuit through which each of said plurality of received first and second training sequences are coupled and said determining means includes means for controlling the gain of said automatic gain control circuit.

25. The apparatus of claim 18 wherein the predetermined symbols in said first and said second training sequences occur at a predetermined symbol rate and said correlating means provides correlation using a clock signal which is n times said predetermined symbol rate, where n is an integer ≧ 1.

26. The apparatus of claim 18 wherein said predetermined set and said another predetermined set of coefficients are binary numbers.

27. The apparatus of claim 26 wherein the binary numbers have equal positive and negative values.

28. The apparatus of claim 26 wherein the binary numbers have values which are zero and non-zero.

29. A method of determining at least one characteristic of signal dispersion in a communications system, said method comprising the steps of generating a first training sequence at least two times in succession and generating a second training sequence at least two times in succession, said first training sequence including a first number of predetermined symbols and said second training sequence including a second number of predetermined symbols, said first and second numbers being different, transmitting each of said first and second training sequences in associated time intervals, correlating each received first training sequence with a predetermined set of coefficients and for correlating each received second training sequence with another set of predetermined set of coefficients, and determining at least one characteristic of said signal dispersion in response to the correlated first and second training sequences.

30. A communications system comprising a transmitter and a receiver which are separated by a communications medium in which signal dispersion may be present, said transmitter comprising means for generating a first training sequence at least two times in succession and for generating a second training sequence at least two times in succession, said first training sequence including a first number of predetermined symbols and said second training sequence including a second number of predetermined symbols, said first and second numbers being different, and means for transmitting each of said first and second training sequences in associated time intervals, and said receiver comprising means for correlating each received first training sequence with a predetermined set of coefficients and for correlating each received second training sequence with another set of predetermined set of coefficients, and means responsive to the correlated first and second training sequences for determining at least one characteristic of said signal dispersion.

31. Apparatus for use in a television signal transmitter wherein the transmitted television signal incorporates a vertical blanking interval in a video frame, said apparatus comprising means for generating a first training sequence at least two times in succession and for generating a second training sequence at least two times in succession, said first training sequence including a first number of predetermined symbols and said second training sequence including a second number of predetermined symbols, said first and second numbers being different, and means for transmitting said successively generated first and second training sequences in at least one vertical blanking interval.

32. The transmitter apparatus of claim 31 wherein said transmitting means also transmits video and audio signals.

33. The transmitter apparatus of claim 31 wherein said transmitting means transmits said video and audio signals in a high definition television signal format.

34. The transmitter apparatus of claim 31 wherein said transmitting means further includes means for spectrally shaping said first and said second training sequences prior to transmission.

35. The transmitter apparatus of claim 34 wherein the predetermined symbols in said first and said second training sequences occur at a predetermined symbol rate and said spectral shaping means includes a tapped delay line clocked at a multiple of said predetermined symbol rate.

36. The transmitter apparatus of claim 34 wherein said spectral shaping means provides raised cosine spectral shaping.

37. Apparatus for use in a television receiver wherein the transmitted television signal incorporates a vertical blanking interval and wherein the transmitted television signal propagates through a communications medium in which signal dispersion may be present, said receiver apparatus comprising means for correlating each of a plurality of received first training sequences with a predetermined set of coefficients and for correlating each of a plurality of received second training sequences with another predetermined set of coefficients, each first training sequence including a first number of predetermined symbols and each second training sequence including a second number of predetermined symbols, said first number being different from said second number, and said first and second training sequences being received during at least one of said vertical blanking intervals, and means responsive to the correlated first and second training sequences for determining at least one characteristic of said signal dispersion.

38. The receiver apparatus of claim 37 wherein said determining means determines the amplitude, delay and phase characteristics of said signal dispersion.

39. The transmitter apparatus of claim 37 wherein said spectral shaping means provides raised cosine spectral shaping.

40. The apparatus of claim 37 wherein the predetermined symbols in said first and said second training sequences occur at a predetermined symbol rate and said correlating means provides correlation using a clock signal which is n times said predetermined symbol rate, where n is an integer ≧ 1.

* * * * *